United States Patent [19]

Jones

[11] Patent Number: 5,174,757
[45] Date of Patent: Dec. 29, 1992

[54] INTERACTIVE SCULPTURAL COMPOSITION

[75] Inventor: Lial A. Jones, Wilmington, Del.

[73] Assignee: Delaware Art Museum, Wilmington, Del.

[21] Appl. No.: 607,017

[22] Filed: Oct. 31, 1990

[51] Int. Cl.⁵ .............................................. G09B 1/10
[52] U.S. Cl. ...................................... 434/96; 434/82; 446/107; 446/118; 446/128
[58] Field of Search ...................... 434/82, 72, 97, 96; 446/107, 118, 85, 108, 111, 113, 114, 116, 117, 118, 122, 128; 482/35

[56] References Cited

U.S. PATENT DOCUMENTS 2,883,764  4/1959  Stephens .............................. 446/118
3,695,616  10/1972  Weber .............................. 446/118 X
3,849,912  11/1974  Kemnitzer ...................... 446/118 X

FOREIGN PATENT DOCUMENTS 3704105  10/1988  Fed. Rep. of Germany ...... 446/122
949154  2/1964  United Kingdom ................ 446/113

OTHER PUBLICATIONS

Jones, Delaware Art Museum Exhibit.

Primary Examiner—Richard J. Apley
Assistant Examiner—Karen A. Richard
Attorney, Agent, or Firm—William E. Dickheiser; Melford F. Tietze

[57] ABSTRACT

An interactive sculptural composition comprising a support member and at least one design member matingly attached thereto. The support member defines a plurality of parallel channels and possesses a multiplicity of projections arranged into rows parallel to the channels with at least one row of projections being present between each adjacent channel. The design member is matingly attached to the support member by either: (1) inserting at least one of the projections of the support member through a hole in the design member or (2) inserting a first edge of the design member into a first channel of the support member and inserting a second edge of the design member into a second, adjacent channel of the support member.

5 Claims, 2 Drawing Sheets

INTERACTIVE SCULPTURAL COMPOSITION

FIELD OF THE INVENTION

This invention is directed to an interactive sculptural composition comprising a support member and at least one design member matingly attached thereto. The support member defines a plurality of parallel channels and possesses a multiplicity of projections arranged into rows parallel to said channels with at least one row of projections being present between each adjacent channel. The design member may be matingly attached to the support member by either: (1) inserting at least one of the projections of the support member through the at least one hole defined by the design member or (2) inserting a first edge of the design member into a first channel of the support member and inserting a second, opposite edge of the design member into a second, adjacent channel of the support member.

BACKGROUND OF THE INVENTION

A widely accepted goal is the stimulation of childrens' interest in art. One of the most effective means of achieving such goal is to let children participate in the creation of artistic works such that they can experience the creative process first hand.

While children may participate in a variety of activities which will permit them to create art and thus to increase their art appreciation, there are certain drawbacks associated with many of such activities. Thus, while many activities such as painting, drawing and the like will serve to stimulate children's artistic expression, these activities do not generally employ renewable materials and can thus impose a significant economic cost on parents, schools and/or museums seeking to so stimulate children.

Moreover, many of these activities require children to act individually and are not easily adaptable to group participation. While such individual expression is desirable in many instances, in certain circumstances group creative activity may be a more useful objective. Thus, certain children may prove reticent to so express themselves individually or in general cases childrens' interest in the creation of art may be further stimulated by activities promoting group participation.

Further, particularly where young children are involved, many available forms of artistic creativity require close supervision of each child in order to avoid the ingestion of the artistic materials and/or damage to property (e.g. clothes, floors, walls) to which such materials are not intended to be applied.

Consequently, there is a need for means for children to participate in the artistic process which does not impose large economic costs, which is readily adaptable to group as well as to individual participation, and which exposes children and property to reduced risk. It is the object of this invention to provide an interactive sculptured composition which is economical, adaptable to single or group participation, and which may be safely employed without undue supervision.

SUMMARY OF THE INVENTION

The present invention is directed to a sculptural composition comprising:

(A) a support member having a front surface defining a plurality of parallel channels and having a multiplicity of projections extending therefrom, said projections being arranged in a plurality of rows parallel to said channels, with at least one of said rows being present between each adjacent channel: and (B) at least one design member in mating configuration with said support member, said design member having a first edge, a second edge opposite said first edge, said design member defining at least one hole extending therethrough, said first edge and said second edge being of a configuration such that they may be fitted into the channels defined in the support member, and said at least one hole having a configuration such that said design member will be in mating configuration with the support member when a projection of said support member is inserted therethrough, said design member having sufficient flexibility and said first edge being separated from said second edge by a sufficient distance such that said design member may be matingly attached to said support member when said first edge of the design member is inserted into a first channel of the support member and when said second edge of the design member is inserted into a second channel of the support member which is adjacent to said first channel.

DETAILED DESCRIPTION OF THE PREFERRED EMBODIMENTS

The interactive sculptural composition of this invention is comprised of a support element and at least one design element in mating configuration therewith. The support element defines a plurality of parallel channels with and contains a multiplicity of projections arranged in rows, such that at least one row of projections is present between each adjacent channel. The at least one design member is placed into mating configuration with the support member by either (1) inserting at least one of the projections of the support member through the at least one hole present in the design member or (2) inserting a first edge of the design member, into a first channel of the support member and inserting a second opposite edge or the design member into a second adjacent channel of the support member.

The present invention will become more fully apparent by reference to the attached drawings, which drawings illustrate preferred embodiments of this invention and which are not intended to limit the scope of this invention in any manner whatsoever.

Figure 1:
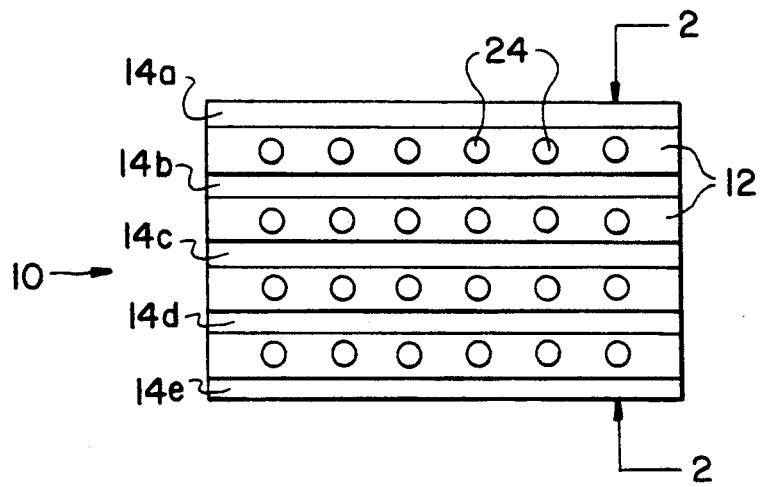
FIG. 1 is a front view of the support member of a preferred embodiment of this invention.

FIG. 1 shows support member 10 having face surface 12. Face surface 12 defines a plurality of parallel channels 14a, 14b, 14c, 14d, and 14e. Although five channels are shown, the support member may define a lesser or greater number of channels. Projections 24 extend from front surface 12. These projections are arranged into a plurality of rows which extend parallel to the channels, with at least one row of such projections being present between each adjacent parallel channel.

While the parallel channels 14 are shown in FIG. 1 as being horizontal, it is within the contemplation of this invention to have such parallel channels extend at any angle from the perpendicular. Moreover, while projections 24 are shown as being circular in cross-section, such projections may be of any cross-sectional slope or variety of cross-sectional shapes.

The support member may be fashioned of any material, such as, wood, hard plastic or metal, which will provide a rigid structural integrity to such member.

Figure 2:
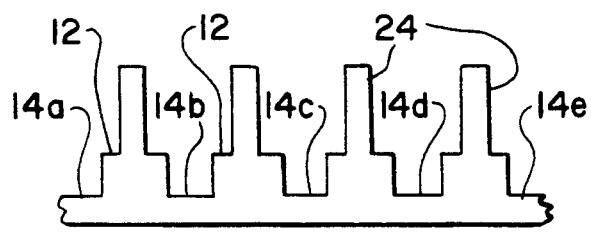
FIG. 2 is a cross-sectional view of the support member of FIG. 1 taken along the lines of arrows 2—2.

FIG. 2 shows a cross-sectional view of the support member of FIG. 1 taken along the line defined by arrow 2 in FIG. 1. Face surface 12 defines parallel channels 14, 14b, 14c, 14d, and 14e. Projections 24 extend outward from surface 12 in rows (not diagramed) which extend parallel to and which are positioned between adjacent parallel channels.

Figure 3:
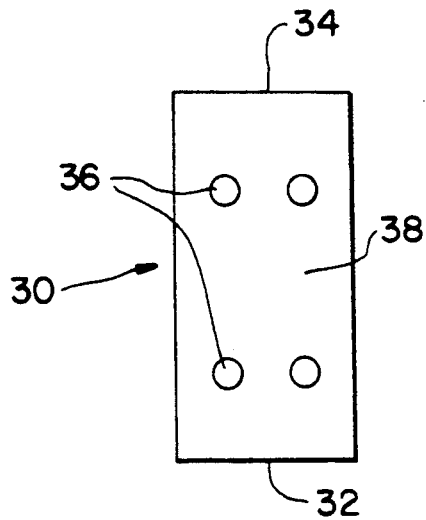
FIG. 3 is a top view of a design member of this invention.

FIG. 3 shows a top view of the design member 30. Design member 30 has a first edge 32 and a second edge 34 which is opposite to first edge 32. Design member 30 also defines at least one hole 36 which extends therethrough.

This at least one hole extends through the face 38 of the design member and extends parallel to edges 32 and 34. The flexibility of design member 30 and the distance between first edge 32 and second edge 34 is such that design member 30 may be matingly attached to a support member by inserting first edge 30 into a first channel of a support member and second edge 32 into a second channel of such support member which is adjacent to such first channel.

Accordingly, design member 30 may be composed of any material such as a rubbery or flexible foamed material which will yield the desired degree of flexibility to such article.

Design member 30 defines at least one hole 36 which is of a configuration such that said design member may be placed into mating configuration with a support member by inserting a projection of such support member through said at least one hole. Although circular holes are shown, the at least one hole may be of any geometric cross-sectional configuration so long as the projecting of the support member may be inserted therethrough. It is preferred that such hole be of dimensions relative to the projections that when a projection is inserted through such hole a friction fit is obtained. Where the design member defines more than one hole, such holes are preferably positioned in the face of the design member such that projections of the support member may be inserted through all of such holes simultaneously.

Preferably, the support member is of a configuration wherein a single row of projections is located between each parallel channel, with the spacing of the projections along each of such rows being equal. It is especially preferable that the distance between each row of projections be equal to the distance between each adjacent projection along the rows, and that the rows be juxtapositioned such that the corresponding projections in each row form a line which is perpendicular to the parallel rows. This will result in the projections forming a series of "squares" in the surface of the support member and will permit a design member defining holes which are a distance apart equal to that of the distance between adjacent projections to be matingly attached to the support member in a manner parallel to the channels (where adjacent projections along a single row are inserted through such holes) or in a manner perpendicular to the channels (by inserting corresponding projections in adjacent rows separated by a single channel through such holes).

Figure 4:
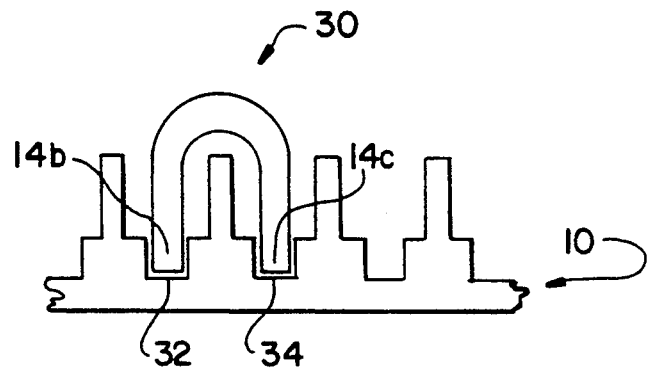
FIG. 4 is a cross-sectional view of the design member of FIG. 3 in mating configuration with the support member of FIG. 2 wherein a first edge of the design member is inserted into a first channel of the design member and a second edge of the design member is inserted into a second adjacent channel of the support member.

FIG. 4 shows design member 30 in mating configuration with support member 10 wherein such mating configuration has been achieved by inserting first edge 32 of design member 30 into channel 14b of support member 10 and second edge 34 of design member 30 into second channel 14c, second channel 14c being adjacent to first channel 14b.

Figure 5:
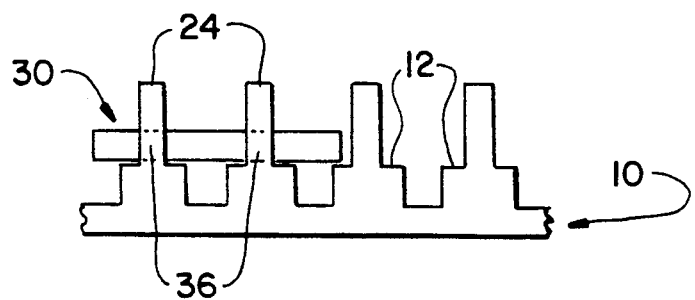
FIG. 5 is a cross-sectional view of the design member of FIG. 3 in mating configuration with the support member is inserted through the at least one hole of the design member.

FIG. 5 shows an alternative configuration wherein design member 30 is in mating configuration with support member 10 by having projections 24 extend through the at least one hole 36 defined through design member 30. Preferably, projections 24 extend from surface 12 of the support member for a sufficient height relative to the thickness of design member 30 such that they can extend through two or more design member which have been "stacked" on top of one another. This configuration will permit the creation of sculptures having an enhanced three-dimensional appearance when viewed from a position opposite the surface of the support members.

Figure 6:
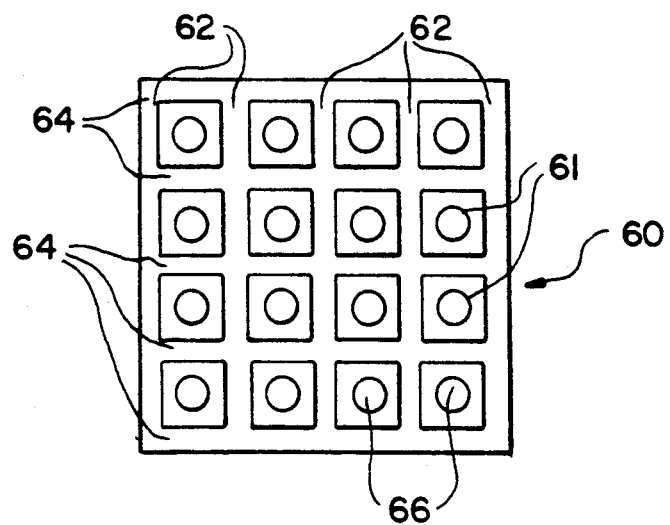
FIG. 6 is a front view of a support member of an alternative embodiment of this invention.

FIG. 6 shows an alternative embodiment of a support member. Support member 60 defines a first set of parallel channels 62 and a second set of parallel channels 64 which are perpendicular to channels 62. Projections 66 extend outward from surface 61 of support member 60. Projections 66 are arranged in rows which run parallel to and which are located between adjacent parallel channels. Design members may be placed into mating configuration with support member 60 by inserting opposite ends of such design member into adjacent parallel channels 62, into adjacent parallel channels 64, or by inserting projection 66 through the at least one hole defined by such design member.

In addition to the support member and at least one design member discussed above, the sculptural composition of this invention may additionally comprise one or more secondary design elements. As is employed herein the term "secondary design element" refers to a design member which does not possess sufficient flexibility and/or distance between its opposite edges such that a first edge may be inserted within a first channel of a support member and a second opposite edge inserted into a second channel of the support member which is adjacent to and parallel to said first channel. Accordingly, such secondary design element may be placed in mating configuration with a support member only by either (1) inserting one edge of the secondary design element into a channel defined in the surface of a support member or (2) inserting a projection of the support member through the at least one hole defined through said secondary design element.

It is preferred that the design member(s) and, if present, secondary design element(s) be constructed of a variety of shapes and colors. By placing design members and secondary design elements into mating configuration with the support member as described above, it is possible for children to create a variety of three-dimensional sculptures. The design member(s) and secondary design element(s) may also be attached to the support member by a variety of other methods, such as inserting a single edge of a design or secondary design element into a single channel, by deforming the design member or secondary design element between at least two projections such that said design member or secondary design element is held compressibly there between, or the like. By employing a support member having sufficient dimensions, the sculptural composition of this invention may readily be employed in an individual or in a group manner. Moreover, the sculptural product can readily be dissembled and reassembled such that no large economic penalty is encountered.

What is claimed is:

1. A sculptural composition comprising:
   (A) A support member having a front surface defining a plurality of parallel channels and having a multiplicity of projections extending therefrom, said projections being arranged in a plurality of rows parallel to said channels, with at least one of said rows being present between each adjacent channel: and
   (B) at least one design member in mating configuration with said support member, said design member having a first edge, a second edge opposite said first edge, said design member defining at least one hole extending therethrough, said first edge and said second edge being of a configuration such that they may be fitted into the channels defined in the support members, and said at least one hole having a configuration such that said design member will be in mating configuration with the support member when a projection of said support member is inserted therethrough, said design member having sufficient flexibility and said first edge being separated from said second edge by a sufficient distance such that said design member may be matingly attached to said support member when said first edge of the design member is inserted into a first channel of the support member and said second edge of the design member is inserted into a second channel of the support member which is adjacent to said first channel.

2. A sculptural composition in accordance with claim 1 wherein the at least one design member is in mating configuration with the support member by having the first edge of the design member inserted into a first channel of the support member and the second edge of the design member inserted into a second channel of the support member, said second channel being adjacent to said first channel.

3. A sculptural composition in accordance with claim 1 wherein the at least one design member is in mating configuration with the support member by having a projection of the support member extend through the at least one hole defined by the design member.

4. A sculptural composition in accordance with claim 1 wherein the projection extending from the support member extend for a distance which is at least twice the length of the at least one hole defined by the design member.

5. A sculptural composition in accordance with claim 1 wherein said composition further comprises at least one secondary design element.

* * * * *